United States Patent
DeFilippis

(10) Patent No.: US 8,896,168 B2
(45) Date of Patent: *Nov. 25, 2014

(54) ELECTRIC MACHINE HAVING A HEAT DISSIPATING CONSTRUCTION

(71) Applicant: Spal Automotive S.r.l., Correggio (Reggio Emilia) (IT)

(72) Inventor: Pietro DeFilippis, Varazze (IT)

(73) Assignee: Spal Automotive S.r.l. (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/720,211

(22) Filed: Dec. 19, 2012

(65) Prior Publication Data
US 2013/0127271 A1 May 23, 2013

Related U.S. Application Data

(63) Continuation of application No. 12/671,779, filed as application No. PCT/IB2008/002017 on Jul. 23, 2008, now Pat. No. 8,362,662.

(30) Foreign Application Priority Data

Aug. 7, 2007 (IT) .............................. BO2007A0576

(51) Int. Cl.
*H02K 9/00* (2006.01)
*H02K 5/00* (2006.01)
*H02K 5/18* (2006.01)
*H02K 3/52* (2006.01)
*H02K 1/18* (2006.01)
*H02K 3/32* (2006.01)
*H02K 9/22* (2006.01)

(52) U.S. Cl.
CPC .. *H02K 9/22* (2013.01); *H02K 5/18* (2013.01); *H02K 3/522* (2013.01); *H02K 1/185* (2013.01); *H02K 3/325* (2013.01)

USPC ................ 310/64; 310/59; 310/89; 310/214; 310/431

(58) Field of Classification Search
CPC ........................................................ H02K 9/22
USPC .................................. 310/64, 89, 400–418, 52
See application file for complete search history.

(56) References Cited

U.S. PATENT DOCUMENTS 3,905,448 A 9/1975 Kawakami et al.
5,608,280 A 3/1997 Tamemoto et al.
(Continued)

FOREIGN PATENT DOCUMENTS

DE 4421269 C1 * 10/1995
FR 2828027 1/2003
(Continued)

OTHER PUBLICATIONS

Machine Translation, Yamamoto et al., JP 08298752 A, Nov. 12, 1996.*
Machine Translation, Nieke et al., DE 4421269 C1, Oct. 12, 1995.*
Machine Translation, Kino et al., JP 08130863 A, May 21, 1996.*

*Primary Examiner* — Tran Nguyen
*Assistant Examiner* — Thomas Truong
(74) *Attorney, Agent, or Firm* — Timothy J. Klima; Shuttleworth & Ingersoll, PLC

(57) ABSTRACT

An electric machine comprises an outer casing (2), a rotor and a stator (3) having at least one polar expansion (5) and at least one winding (8) having an annular shape and placed around the polar expansion (5). The casing (2) has a plurality of protrusions (13) each of which holds, by supporting, a corresponding portion (12) of a stator winding (8) to enable heat exchange between the winding (8) and the protrusion (13). Each portion (12) of the winding (8) is electrically insulated from the respective protrusion (13).

13 Claims, 5 Drawing Sheets

(56) References Cited

U.S. PATENT DOCUMENTS

| | | |
|---|---|---|
| 6,201,321 B1 | 3/2001 | Mosciatti et al. |
| 6,211,587 B1 | 4/2001 | Enomoto et al. |
| 6,809,441 B2 | 10/2004 | Randall |
| 8,164,227 B2 * | 4/2012 | Holopainen .................... 310/89 |
| 2007/0122293 A1 * | 5/2007 | Sugiyama et al. ............ 417/354 |
| 2009/0058206 A1 | 3/2009 | Bremner |

FOREIGN PATENT DOCUMENTS

| | | |
|---|---|---|
| JP | 08130863 | 5/1996 |
| JP | 08298752 A * | 11/1996 |
| JP | 2003269635 | 9/2003 |
| SU | 1686621 | 10/1991 |
| WO | 03012954 | 2/2003 |
| WO | WO 2007077303 A1 * | 7/2007 |

* cited by examiner

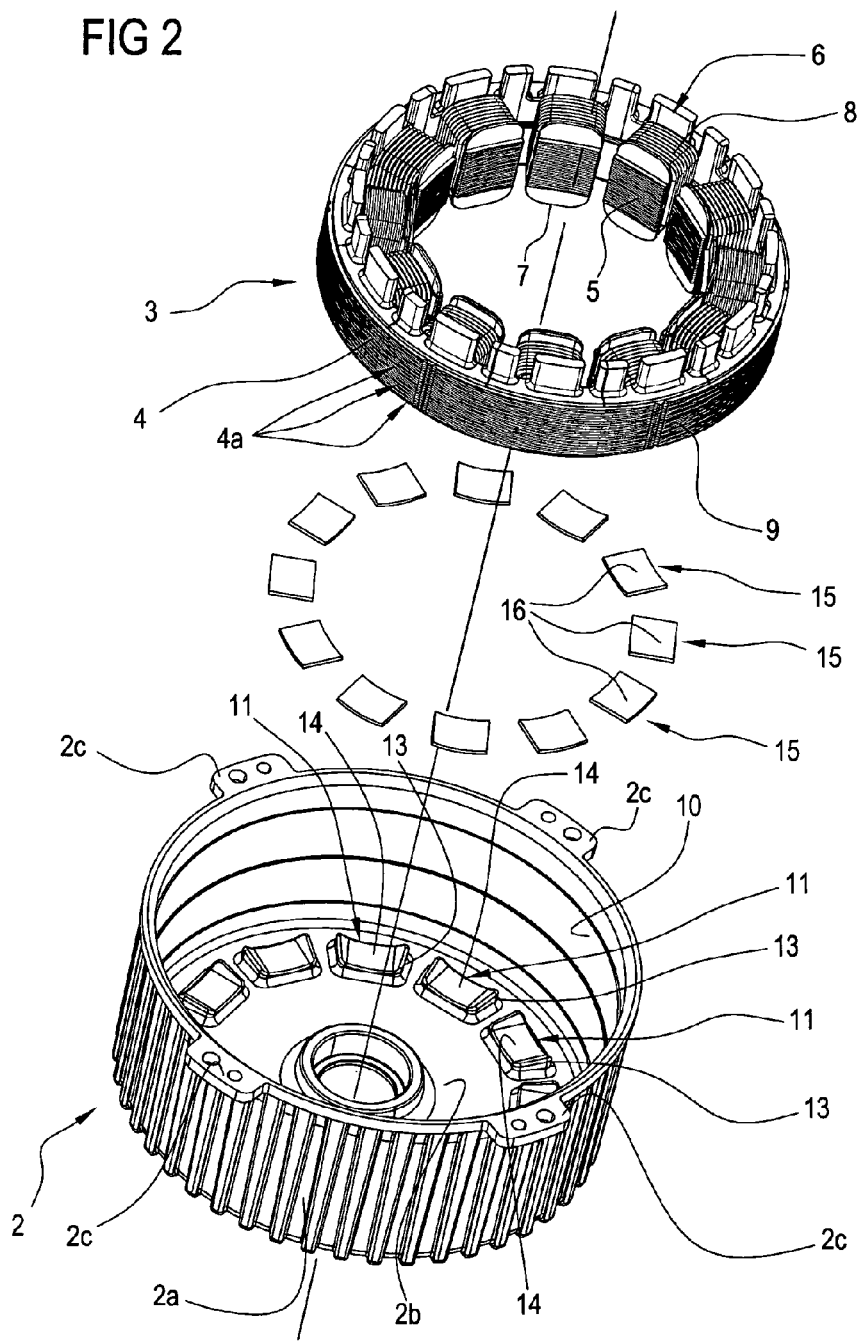

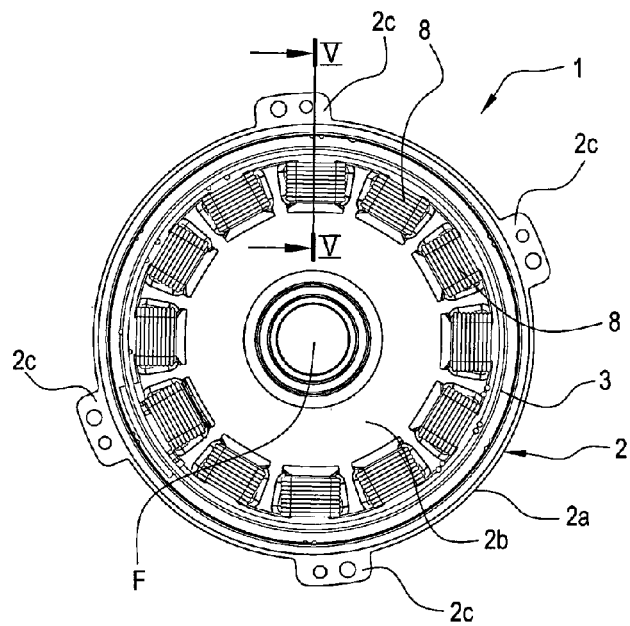
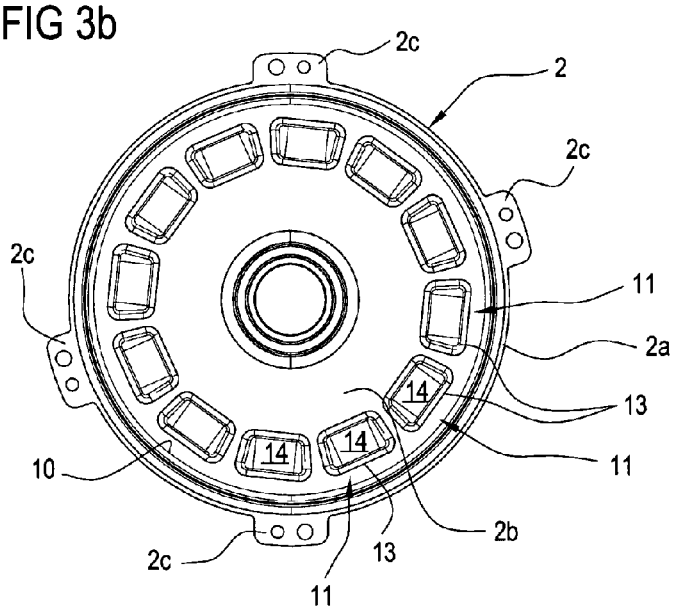

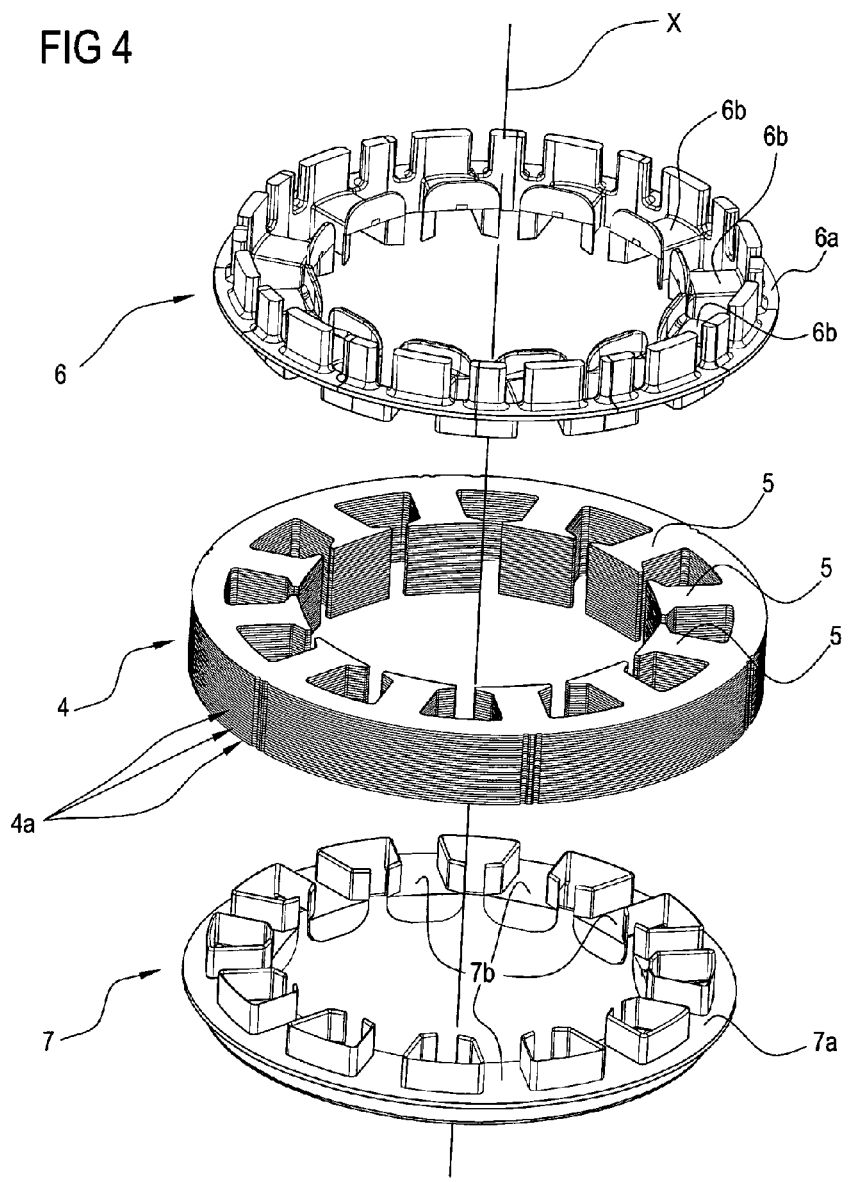

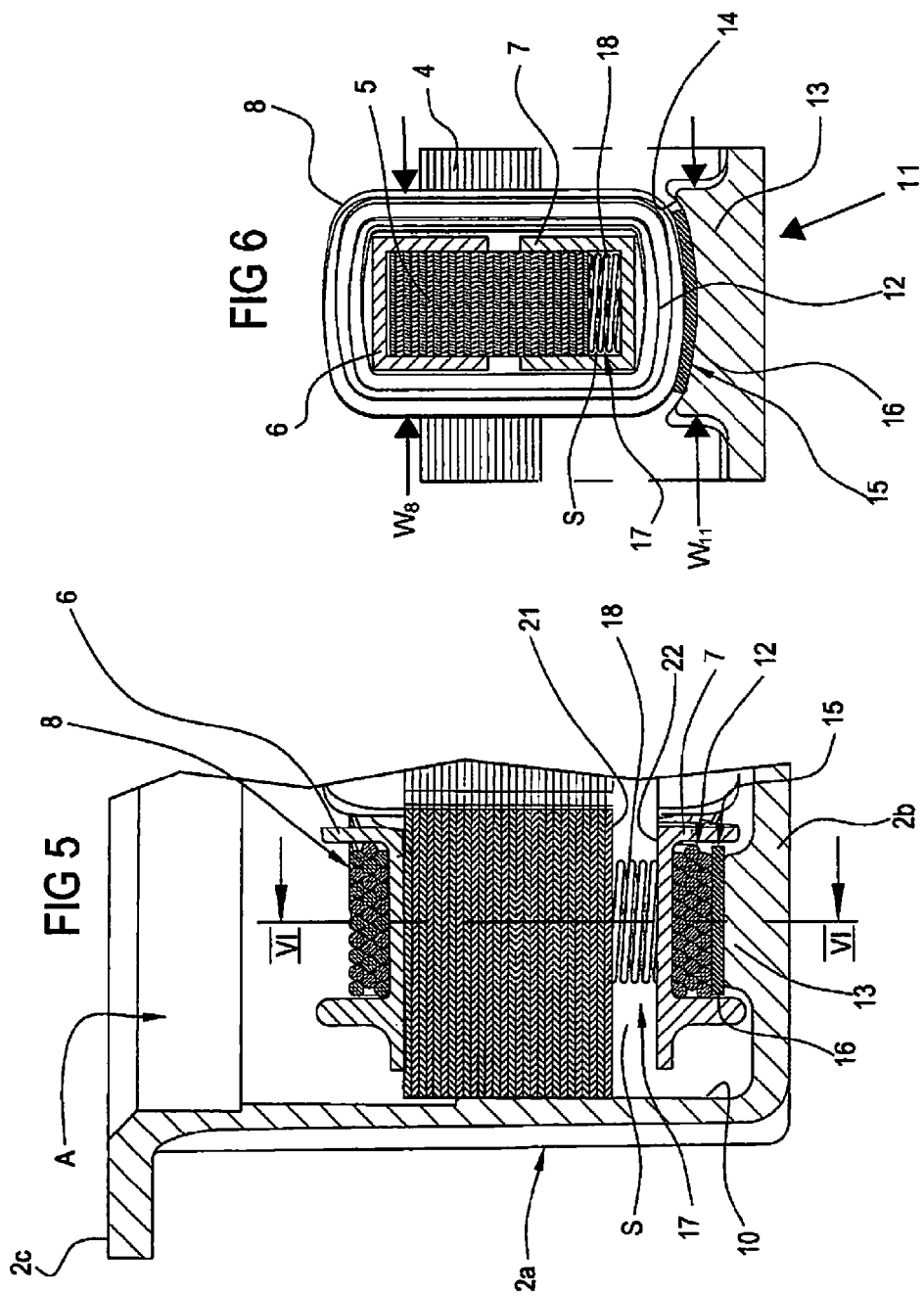

ELECTRIC MACHINE HAVING A HEAT DISSIPATING CONSTRUCTION

CROSS-REFERENCE TO RELATED APPLICATIONS

This application is a continuation of U.S. patent application Ser. No. 12/671,779 filed Mar. 1, 2010, which is the National Phase of International Application PCT/IB2008/002017 filed Jul. 23, 2008 which designated the U.S. and that International Application was published under PCT Article 21(2) in English.

This application claims priority to U.S. patent application Ser. No. 12/671,779 filed Mar. 1, 2010, Italian Patent Application No. BO2007A000576 filed Aug. 7, 2007, and PCT Application No. PCT/IB2008/002017 filed Jul. 23, 2008. The entirety of all three applications are incorporated by reference herein.

TECHNICAL FIELD

This invention relates to an electric machine.

In particular, the invention relates to a rotary electric machine of the type with stator windings, for example a motor of the type used to drive an electric cooling fan for automotive applications or an electricity generator. Preferably, the electric machine according to this invention is a brushless type electric motor.

The invention also refers to a sealed electric machine, particularly suitable for use in dusty environments or in environments characterized by an atmosphere unsuitable for entering into direct contact with the electromechanical components of the electric machine.

BACKGROUND ART

Prior art windings for an electric machine, whether they are of the stator or rotor type, are made from a plurality of turns of a conductive material, generally copper, formed by winding a lead wire around two or more polar expansions of the stator and/or the rotor of the electric machine. The winding, through which an electric current passes, must be suitably insulated from the polar expansions, which are made from ferromagnetic material. For this purpose, prior art places a layer of electrically insulating material between the winding and the corresponding polar expansion on which it is wound.

Electric currents, including high ones, pass through the winding and cause heating due to the Joule effect which extends through the entire winding and adjacent areas of the electric machine.

In particular, it has been found that the heat produced in this way deteriorates the conductivity properties of the lead wire, which consequently generates a greater resistance to the passage of current causing a high and often unacceptable energy loss.

In addition, the overheating of the winding may result in fast deterioration of the insulation characteristics of the above-mentioned layer of electrically insulating material placed between the winding, and the corresponding polar expansion on which it is wound. This results in evident risks of short circuits and permanent damage to the electric machine, which must therefore be replaced or undergo costly maintenance.

This situation is particularly serious in rotary electric machines of the sealed type, in which the windings are immersed in a sealed environment subjected to continuous heating due essentially to the above-mentioned heating caused by the Joule effect. This sealed environment is not subject to an exchange of air, and, under steady-state conditions, there may be high temperatures inside this environment which favour overheating of the windings.

DISCLOSURE OF THE INVENTION

The aim of the present invention is therefore to provide an electric machine that is free of the above-mentioned shortcomings.

One aim of the present invention is to provide an electric machine with a high level of reliability.

Another aim of the invention is to provide an electric machine which makes best use of the available power, minimising the energy losses.

The stated technical purposes and aims, and others, are substantially achieved by an electric machine as described in claim 1 and in one or more of the claims dependent thereon.

BRIEF DESCRIPTION OF THE DRAWINGS

Further features and advantages of the present invention are more apparent in the detailed description below, with reference to a preferred, non-limiting, embodiment of an electric machine, as illustrated in the accompanying drawings, in which:

FIG. 2 illustrates a perspective exploded view of the detail of FIG. 1;

FIG. 3a illustrates a plan view of the detail of FIG. 1;

FIG. 3b illustrates a plan view of a first portion of the detail of FIG. 1;

FIG. 4 illustrates a perspective exploded view of a second portion of the detail of FIG. 1;

FIG. 5 illustrates a section view of the detail of FIG. 1 through the line V-V shown in FIG. 3a;

FIG. 6 illustrates a section view of the detail of FIG. 1 through the line VI-VI shown in FIG. 5.

DETAILED DESCRIPTION OF THE PREFERRED EMBODIMENTS OF THE INVENTION

Figure 1:
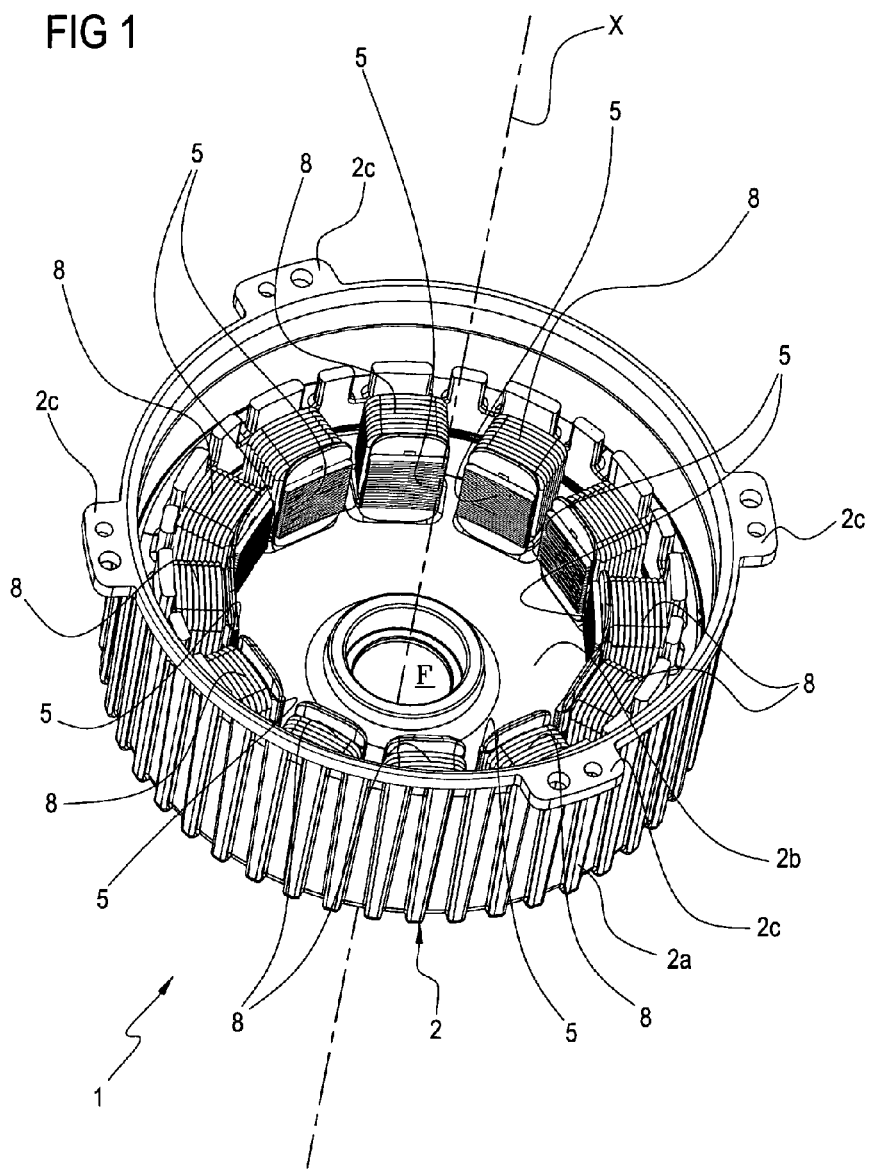
FIG. 1 illustrates a perspective view of a detail of an electric machine according to the present invention, with some parts cut away to better illustrate others.

The electric machine described in detail below is specifically an electric motor. However, the technical characteristics and the teachings of the present invention also apply to other rotary electric machines, in particular to electricity generators.

With reference to the accompanying drawings, the numeral 1 denotes in its entirety an electric motor according to the present invention.

The electric motor 1 comprises a casing 2 to define an outer shell, a stator 3 permanently associated inside the casing 2, and a rotor which is not illustrated since it is not relevant to the present invention.

Preferably, the electric motor 1 in accordance with the present invention is of the sealed type. For this purpose, the casing 2 comprises a substantially cylindrical lateral wall 2a and a bottom wall 2b rigidly connected to the lateral wall 2a to define a single body with a bell shape. On the opposite side to the bottom wall 2b, the lateral wall 2a has a substantially circular opening "A" and it is permanently associated with a closing cap or cover, which is not illustrated, in particular by means of flanges 2c jutting out from the lateral wall 2a. The bottom wall 2b is also fitted with a central hole "F" used to house a bearing The stator 3 is of the wound type, and comprises a stator body 4 with a toroidal shape and defined by a plurality of superposed laminations 4a packed together to define a single body, as illustrated in FIG. 4. The stator body 4 has at least one polar expansion 5, preferably a plurality spaced at equal angular intervals. Each polar expansion 5 extends radially towards an axis "X" of the stator 3 around which the stator 3 extends to coincide substantially with an axis of rotation of the rotor.

As shown in FIG. 4, the stator 3 also comprises a pair of half shells 6, 7 made from insulating material and which may be associated together to substantially envelop all the above-mentioned polar expansions 5. In particular, the two insulating half shells 6, 7 define electrical insulating elements between the winding 8 and the polar expansion 5 and they approach each other from opposite sides of the stator body 4 along a direction parallel to the above-mentioned axis "X" of the stator 3. More in detail, each half shell 6, 7 has an annular portion 6a, 7a and a plurality of protruding portions 6b, 7b each to be used to at least partially envelop a respective polar expansion 5.

Each polar expansion 5, covered with the respective pair of protruding portions 6b, 7b, defines a core on which a respective stator winding 8 may be formed. As shown in FIG. 2, each winding 8 has an annular form and comprises a plurality of adjacent and/or superposed turns connected in series, obtained by winding a single lead wire around the above-mentioned core. The presence of the protruding portions 6b, 7b of the insulating half shells forms an electrical insulation of the winding 8 with respect to the corresponding polar expansion 5. FIG. 2 illustrates the stator 3 after the windings 8 have been formed.

The stator 3 is inserted in the casing 2, in particular by means of a customary keying or shrinking-on process, in which a cylindrical lateral surface 9 of the stator body 4 is coupled with a corresponding cylindrical inner surface 10 of the casing 2, in order to reach a configuration illustrated in FIGS. 1 and 5. The stator 3 is inserted in the casing 2 along the above-mentioned axis "X" of the stator 3.

FIG. 3 illustrates in detail the angular distribution of the twelve polar expansions 5 placed at angular intervals from each other, preferably equally spaced.

Advantageously, the bottom wall 2b of the casing 2 has at least one butting portion 11 to engage, preferably by supporting, with a portion 12 of the winding 8 to enable heat exchange from the portion 12 of the winding 8 to the butting portion 11 in order to cool the winding 8. In order to improve this cooling effect, and in accordance with an embodiment not illustrated, the bottom wall 2b of the casing 2 has an outer surface, that is to say, facing the outside of the electric motor 1, fitted with fins to favour heat exchange between the bottom wall 2b and the outside environment.

Preferably, the butting portion 11 is substantially shaped to match an outer shape of the portion 12 of the winding 8 which it holds, and it is defined by a protrusion 13 formed on the bottom wall 2b of the casing 2. The protrusion 13 extends away from the bottom wall 2b to a space inside the electric motor 1, and it faces a direction preferably parallel to the axis "X" of the stator 3. The portion 12 of the winding 8 which engages with the protrusion 13 is, in particular, a front portion of the winding 8 facing the bottom wall 2b of the casing 2 along a direction for inserting the stator 3 in the casing 2.

The protrusion 13 has a rounded butting surface 14 whose concavity faces the opposite side with respect to the bottom wall 2b, that is to say, faces the above-mentioned space inside the electric motor 1. The butting surface 14 may therefore be engaged with the portion 12 of the winding 8, the portion 12 of which is part of the toroidal form of the winding 8 and is therefore curved and, more in detail, convex.

As shown in FIG. 3b, the bottom wall 2b has a plurality of protrusions 13, in particular twelve protrusions 13 spaced at equal angular intervals and placed around the axis "X" of the stator 3. The protrusions 13 are located on the bottom wall 2b at the positions adopted by the respective portions 12 of the windings 8 after assembly of the electric motor 1 that is to say, after the stator 3 has been fitted in the casing 2.

Advantageously, between each protrusion 13 and the respective portion 12 of the winding 8 there is at least one intermediate element 15, either rigid or flexible, made from a thermally conductive and electrically insulating material. Preferably, the intermediate element 15 is in the form of a shim 16 and is removably fitted between the protrusion 13 and the portion 12 of the winding 8 to enable transfer of thermal power between the protrusion 13 and the portion 12 of the winding 8 whilst maintaining them electrically insulated, in order to avoid short circuits.

Preferably, the intermediate element is a shim made of Silpad®, and has at east the property of mechanical compressive strength.

In its undeformed state, the shim 16 extends mainly in one plane over an area with a size, measured along this plane, at least equal to a potential surface of contact between the protrusion 13 and the portion 12 of the winding 8, so as to insulate the entire butting surface 14 of the protrusion 13 with respect to the winding 8.

Advantageously, the electric motor 1 comprises thrust means 17 active on the portion 12 of the winding 8 to maintain the above-mentioned portion 12 pressed against the respective protrusion 13. The above-mentioned thrust means 17 are mounted on the stator 3 and comprise at least one elastic element 18 active between the above-mentioned portion 12 of the winding 8 and the stator body 4, in particular the polar expansion 5 of the stator body.

According to a preferred embodiment illustrated in FIGS. 5 and 6, each elastic element 18 is placed between the stator body 4 and the lower half shell 7 and, in more detail, between a lower surface 21 of the stator body 4 and an upper surface 22 of the respective protruding portion 7b of the lower half shell 7.

Basically, the stator body 4 and the lower half shell 7 delimit a space "S", which is illustrated not in proportion for greater clarity, in which the elastic element 18 is housed.

The space "S" is delimited above by the lower surface 21 of the stator body 4, and below by the upper surface 22 of the respective protruding portion 7b of the lower half shell 7.

The elastic elements 18 are positioned in the pace "S" before the windings are formed.

Each portion 12 of the winding 8 engaging with the respective butting portion 11 is movable away from the stator body 4 under the action of the elastic element 18. In addition, the lower half shell 7 keyed to the polar expansion 5 slides on the polar expansion 5 itself.

A stator 3 of the type described above, that is to say, fitted with an elastic element 18 for each winding 8, may be inserted inside the casing 2 along the axis "X" of the stator 3, until it abuts the portions 12 of the windings 8 against the respective protrusions 13 through the above-mentioned interposed shims 16. In particular, the stator 3 is pushed along its axis "X" until the portion 12 of each winding 8 enters into contact with the respective protrusion 13 formed on the bottom wall 2b of the casing 2, and it is further pushed until it compresses each elastic element 18. Following this compression, the stator 3 is permanently fixed, for example on an abutment ledge, not illustrated, preferably in an irreversible manner. FIG. 6 shows a circumferential width $W_{11}$ of each butting portion 11 is substantially the same as a circumferential width $W_8$ of each winding 8.

Basically, the stator is inserted, for example hot, inside the casing until it reaches an operational position identified by the abutment ledge at which it is permanently fixed.

In this position the elastic elements 18 apply a predetermined perpetual and substantially constant thrust on the corresponding portion 12 of the winding 8, that is to say, on the lower half shell 7. This results in a significant advantage if shims 16 are used, the electrical insulation and thermal conductivity properties of which reach optimum values if subjected to a substantial surface pressure, for example at least 1.5 kg/cm² in the case of Silpad® shims As described above, the stator 3 is fixed to the casing 2 by interference between the lateral cylindrical surface 9 of the stator body 4 and the inner cylindrical surface 10 of the casing 2. If this interference is obtained by shrinking on, in which an expansion of the casing 2 is generated, the thrust action on the stator 3 against the bottom wall 2b of the casing 2 is maintained until the stator 3 has been fixed, that is to say, until a stabilisation of the above-mentioned interference has been reached. In this way, there is no risk of elastic return of the elastic elements 18 during a cooling of the casing 2, which would cause a loss or reduction of the compressive action on the above-mentioned shims 16.

The present invention achieves the above-mentioned aims and overcomes the shortcomings of prior art.

The electric machine according to the present invention provides an effective cooling action thanks to the adoption of Silpad® shims which enable heat exchange by conduction between the windings and the casing without this contact generating short circuits in the windings. Consequently, it is possible contain the maximum operating temperatures of the windings, which can therefore be used longer without this causing deterioration of the conductivity properties of the windings, nor decay of the insulating properties of the half shells keyed to the stator body.

Lastly, the presence of the thrust means active on the windings enables the stator to be fitted on the casing maintaining a substantially constant thrust action, with a desired value, of the windings against the protrusions of the casing. This thrust may be in particular determined to achieve optimum operation of the Silpad® shims. Moreover, the mechanical compressive strength exhibited by the Silpad® shims enables the shims to be "clamped" between the windings and the protrusions and, at the same time, to make an important contribution to the thermal conductivity and electrical insulation.

What is claimed is:

1. An electric machine comprising:
   an outer casing;
   a stator having a plurality of polar expansions and a plurality of windings, each winding having an annular shape and fitted around one of the polar expansions;
   a rotor;
   wherein the casing has a plurality of separate butting portions, each paired with one of the windings to engage and support a portion of the winding to enable heat exchange between the winding and the butting portion, the winding being electrically insulated from the butting portion when engaged with the butting portion;
   wherein the casing comprises a bottom wall lying substantially perpendicular to an axis of rotation of the rotor, each butting portion being formed by an integral and solid protrusion of the bottom wall facing a space inside the electric machine and extending away from an interior facing side of the bottom wall and into the space inside the electric machine along a line parallel to an axis of rotation of the rotor;
   each butting portion having a center radial plane generally aligned with a central radial plane of the winding with which it is paired;
   a radially extending passage positioned between two adjacent butting portions for allowing cooling air to flow between the two adjacent butting portions.

2. The electric machine according to claim 1, comprising a plurality of thermally conductive and electrically insulating intermediate elements separate from the windings and the butting portions, each intermediate element having a mechanical compressive strength and being positioned between one of the winding and butting portion pairs to facilitate heat exchange between the winding and the butting portion whilst keeping the winding and the butting portion electrically isolated from one another.

3. The electric machine according to claim 2, wherein the intermediate element is removably fitted between the winding and the butting portion.

4. The electric machine according to claim 2, wherein the intermediate element comprises a shim extending mainly in one plane and having dimensions at least equal to a potential surface of contact between the winding and the butting portion.

5. The electric machine according to claim 4, wherein the bottom wall has a finned outer surface to aid heat exchange between the bottom wall and an exterior of the electric machine.

6. The electric machine according to claim 1, wherein the protrusion has a butting surface substantially shaped to match the winding.

7. The electric machine according to claim 6, wherein the butting surface is rounded with concavity facing the space inside the electric machine.

8. The electric machine according to claim 1, comprising a plurality of thrust mechanisms, each active on one of the windings to maintain the winding pressed against the butting portion it is paired with.

9. The electric machine according to claim 8, wherein each thrust mechanism comprises at least one elastic element active between the winding and the polar expansion it surrounds.

10. The electric machine according to claim 8, wherein the winding is wound on the respective polar expansion to form a space between the winding and the polar expansion it surrounds, the elastic element being positioned inside the space.

11. The electric machine according to claim 10, wherein the space is delimited on one side by an electrically insulating element active between the polar expansion and the winding, and on another side by the winding.

12. The electric machine according to claim 1, wherein the plurality of protrusions are spaced at angular intervals.

13. The electric machine according to claim 1, wherein a circumferential width of each butting portion is substantially the same as a circumferential width of each winding.

* * * * *